United States Patent Office 2,945,071
Patented July 12, 1960

2,945,071
PROCESS FOR THE PREPARATION OF DEUTERATED HYDROCARBON COMPOUNDS

Hendrik Kloosterziel and Willem J. Pieters, both of Amsterdam, Netherlands, assignors to Shell Oil Company, a corporation of Delaware No Drawing. Filed June 25, 1957, Ser. No. 667,993

Claims priority, application Netherlands Nov. 16, 1956

1 Claim. (Cl. 260—668)

The invention relates to a process for the preparation of wholly or partly deuterated hydrocarbon compounds and to a process for the preparation of deuterated carbon from these deuterated hydrocarbon compounds, and also to a process for the use of the resultant deuterated products as moderator or reflector in nuclear reactors.

It is known that when gaseous hydrocarbons together with deuterium are passed over nickel as catalyst, deuterated hydrocarbons may be identified in the resultant reaction mixture. However, this method of deuteration has not found acceptance in the art, this being chiefly attributed to the fact that in the said reaction mixtures a large excess of non-deuterated hydrocarbon is present, from which the deuterated products can only be separated with difficulty. A complete deuteration dispensing with the need for the separation of deuterated and non-deuterated material would require a large excess of deuterium, and large quantities of deuterium mixed with hydrogen would be drawn off.

The invention now provides a process for deuterating hydrocarbon compounds, which enables, if desired, completely deuterated hydrocarbons, free from nondeuterated material, to be prepared in a simple manner, while at the same time little or no deuterium mixed with hydrogen is drawn off. According to the invention hydrocarbon compounds to be deuterated are passed over a catalyst charged with deuterium in a previous phase of the process. These hydrocarbon compounds are passed in a gaseous state or as vapor over the catalyst. By charging with deuterium is here meant charging with deuterium as such as well as charging with such compounds thereof as for instance heavy water.

The hydrocarbon compounds to be deuterated may be any hydrocarbon or mixture of hydrocarbon that can be deuterated at the temperatures employed. Normally liquid hydrocarbon distillates obtained from petroleum are, for example quite suited. For the production of deuterated coke aromatic hydrocarbons or oils rich in aromatic hydrocarbons are preferred. Oxygen may also be present in these compounds, for instance, in the form of a hydroxyl group or bound as in an ether. The hydrocarbon is preferably substantially free of sulfur but freedom from sulfur is not essential. When deuterium itself is used with a hydrogenation catalyst the deuteration is most rapid in the case of unsaturated hydrocarbons and aromatic hydrocarbons since in addition to deuteration by exchange some direct addition of deuterium takes place.

The catalysts used may generally be substances which adsorb hydrogen, e.g. nickel, palladium, platinum, tungsten and various other metals. Other suitable catalysts are the hydrides of metals of the first, second and third groups of the periodic table, in particular those of calcium and barium, and also various metal oxides such as zinc oxide and oxides or sulfides of metals of the sixth and eighth groups of the periodic table such as Ni, Co, Fe, Wo, Mo and Cr and cracking catalysts, e.g. alumina and mixtures of silica and alumina. These catalysts constitute two known classes of catalysts, namely those known to be hydrogenation-dehydrogenation catalysts and those known to be acidic cracking catalysts. Those having hydrogenation-dehydrogenation activity are in general metals, oxides, sulfides or other inorganic compounds e.g. chromites, molybdates, etc. of transition metals. Those having cracking activity are generally composed of alumina and composites of silica with alumina and/or magnesia and/or zirconia and/or beryllia and/or boria and/or thoria e.g. acid treated clays.

The question as to which temperatures are most favorable for the deuteration is largely determined by the nature of the catalyst. When the above metals are used as catalysts, the reaction temperatures may generally be lower than when various oxides are used. With tungsten for instance Dry Ice temperature can be used when the hydrocarbon is a paraffin. Whereas with nickel a minimum temperature of around 50° C. is necessary in the case of paraffins. Suitable temperatures are generally in the range of from 0°–600° C., but it should, of course, be noted that higher temperatures within this range should be avoided where they are very liable to cause decomposition or other undesirable conversions. For example, with nickel it is generally desirable to operate below about 200° C.

If alumina is used as a catalyst the most suitable reaction temperatures lie above 250° C. In deuterating aromatics and other unsaturated hydrocarbons, using metals as catalysts, it may be desirable to apply temperatures below 250° C., so that hydrogenation becomes less of a drawback. Although thermodynamically the equilibrium in the hydrogenation reaction lies more to the side of the hydrogenated hydrocarbons the lower the temperature, hydrogenation proceeds slowly at a lower temperature.

Charging of the catalyst with deterium can be effected at the same temperature as deuteration, although this is not essential. In general, the lower the temperature the more completely the metals are charged. The rate of charging frequently increases with the temperature, especially in the case of oxides and hydrides.

Deuteration and also charging of the catalyst with deuterium may be conducted under atmospheric pressure, but if desired superatmospheric pressures may also be used.

Certain catalysts, such as the metals referred to, are more suitable for charging with deuterium than with deuterium compounds. With other catalysts the reverse may be the case. Very satisfactory results were obtained with hydrous alumina, which, after part of its water content has been removed, e.g. until a water content of 0.5–4% by weight remained, was charged with the vapor of heavy water. In order to reduce the formation of carbon in deuteration, after drying, the alumina may be subjected to an after-treatment with hydrogen fluoride.

The catalysts may often advantageously be supported on carriers. Suitable carriers are kieselguhr, silica gel, pumice stone, active carbon, etc. The mixture of catalyst and carrier is generally reduced to the form of grains or pellets of a convenient size.

In the practical mode of carrying out the process according to the invention a column filled with catalyst may be used which is alternately charged with deuterium and contacted with the hydrocarbon compound to be deuterated. It is thus possible to pass alternately through the column deuterium (or a deuterium-containing gas or vapor) and the vapor of the hydrocarbon compound to be deuterated, and the direction in which the gases or vapors flow during charging or deuterating, may be the same or opposite.

In the continuous method this process may be carried out by using a series of catalyst-filled towers, one part of which series is in the charging phase and the remainder in the deuterating phase. A deuterium-containing gas flows in series through the former part, hereinafter referred to as the charging series, which gas is entirely stripped of its deuterium content as it passes through the successive towers. The hydrocarbon compounds to be deuterated flow in series through the remaining towers, hereinafter referred to as the deuteration series. From time to time the tower having the largest deuterium charge is cut out from the beginning of the charging series, the beginning of the charging series thus being repeatedly moved up one tower. The tower cut out is connected up to the end of the deuteration series. The tower at the beginning of the deuteration series which has the most depleted deuterium content is then cut out from the deuteration series and connected up to the end of the charging series where it is first treated with gas having a greatly decreased deuterium content; the beginning of the charging series will afterwards move up to this tower, the latter then being successively treated with gas of a constantly increasing deuterium content, until this tower itself constitutes the beginning of the charging series, is cut out from the deuterium flow and again connected up to the end of the deuteration series, etc.

In another mode of continuous execution of the process two towers are employed, viz. a charging tower and a deuteration tower. In the charging tower the catalyst flows in countercurrent to a gas containing deuterium. In the deuteration tower the catalyst flows in countercurrent to a flow of hydrocarbon compound to be deuterated. In both towers the catalyst will of course, move most readily from the top to the bottom. The catalyst is transported from the lower end of the charging tower to the upper end of the deuteration tower, and from the lower end of the deuteration tower to the upper end of the charging tower by means of suitable conveyor elements. The towers may be arranged at the same height, although the preferred arrangement is that in which one tower is on a higher level than the other.

The deuterated products of the present process, in particular the polycyclic ones, are very suitable for the preparation of deuterated coke by pyrolysis. This coke is actually a solid hydrocarbon material containing from 0.5 to about 5% of bonded deuterium. The pyrolysis of the deuterated hydrocarbon may be effected by any of the known so-called coking processes. Deuterium-containing gases thus formed as by-product in the preparation of deuterated coke may be used again to charge the catalyst in the process according to the invention.

The deuterated hydrocarbon compounds obtained according to the invention, and also the deuterated coke which may be prepared from the hydrocarbon compounds, are very suitable for use as moderator or reflector in nuclear reactors.

*Example*

100 g. of commercial alumina, containing approximately 18% of water, was introduced into a vertically arranged tubular reactor. Dry nitrogen gas was then passed upwards through the tube at 500° C., until the issuing gas no longer contained any visible quantities of water formed by condensation at —80° C. A nitrogen stream, which had first been dried and afterwards saturated with heavy water at room temperature, was subsequently passed through the tube in the same direction for 4 hours, at a rate of 25 liters per hour, the temperature now being, however, 450° C. At the end of this time the quantity of water absorbed by the alumina was more than 2 grams. 4 g. of benzene was then passed downward for 1 hour through the alumina, likewise at 450° C., and collected in a condensation vessel placed at the bottom of the reactor. The last remainder of benzene was expelled from the reactor by means of a nitrogen stream.

The benzene collected in the condensation vessel was analyzed by mass spectrometry. It was found that 52% of the hydrogen atoms had been replaced by deuterium.

We claim as our invention:

Process for the production of deuterated hydrocarbon of the nature of coke which comprises deuterating a hydrogen-absorbing catalyst selected from the group consisting of solid acidic cracking catalysts and solid hydrogenation-dehydrogenation catalysts by passing through a relatively stationary bed of said catalyst a gas mixture produced by the pyrolysis of deuterated hydrocarbons, then passing through the thus deuterated catalyst in the absence of said gas mixture vapors of a hydrocarbon, collecting the resulting deuterated hydrocarbon and pyrolyzing the same under conditions to produce the above mentioned deuterium containing gas mixture and a deuterated solid hydrocarbon of the nature of coke.

References Cited in the file of this patent
UNITED STATES PATENTS

| | | |
|---|---|---|
| 826,089 | Day | July 17, 1906 |
| 1,897,798 | Guthke | Feb. 14, 1933 |
| 2,073,578 | Gwynn | Mar. 9, 1937 |
| 2,620,362 | Stiles | Dec. 2, 1952 |
| 2,678,339 | Harris | May 11, 1954 |
| 2,687,983 | Garwood | Aug. 31, 1954 |
| 2,690,382 | Joris | Sept. 28, 1954 |
| 2,790,015 | Hindin | Apr. 23, 1957 |
| 2,900,424 | Frazer | Aug. 18, 1959 |

OTHER REFERENCES

MacWood et al.: "J. Chem. Physics," vol. 4, July 1936, pages 402–406.